(No Model.)
3 Sheets—Sheet 1.
C. LA DOW.
HORSE RAKE.
No. 248,478. Patented Oct. 18, 1881.
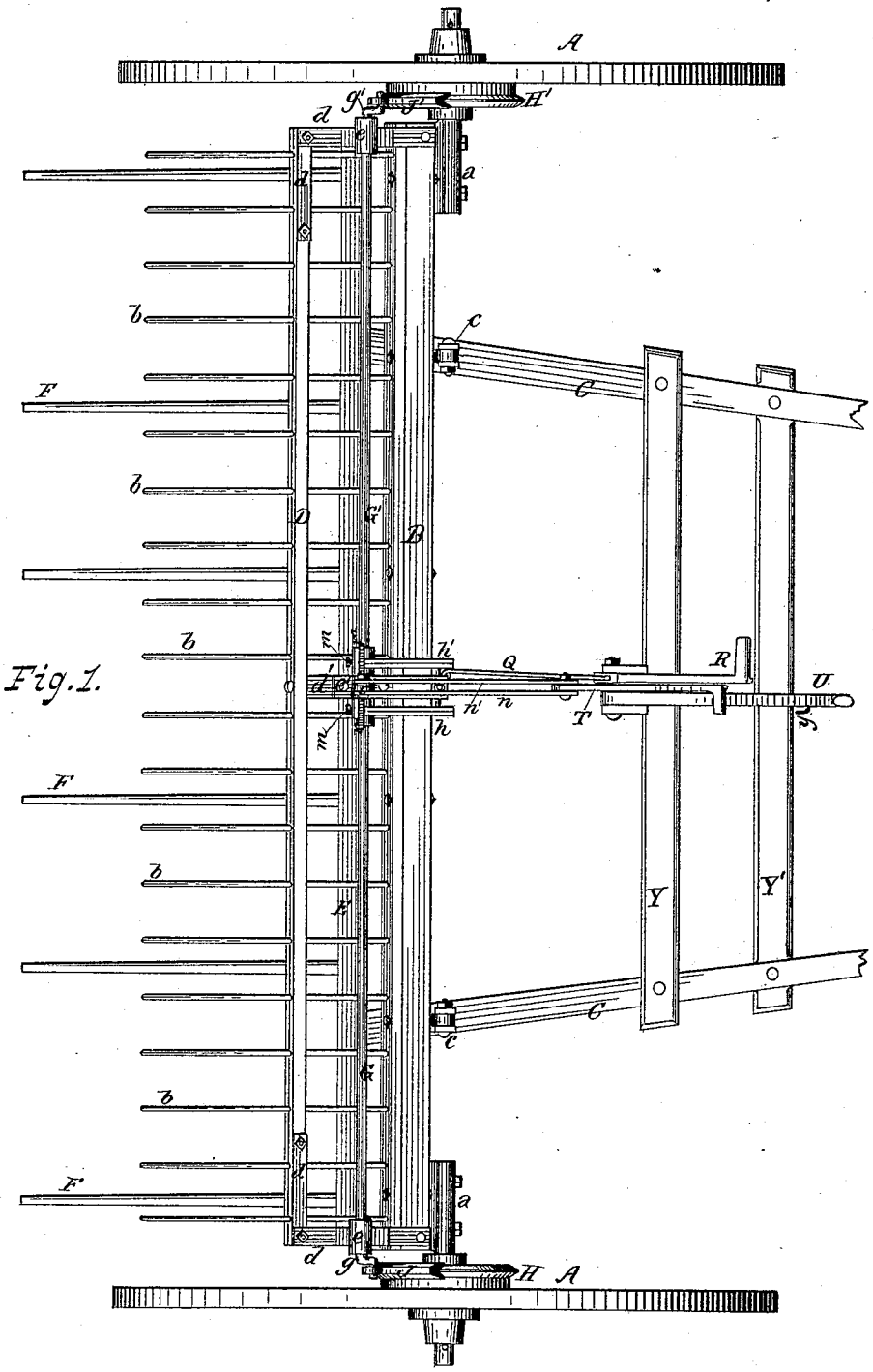
Witnesses.
Jas. E. Hutchinson
J. A. Rutherford
Inventor.
Chas. La Dow,
By James L. Norris.
atty.

(No Model.)  3 Sheets—Sheet 2.
C. LA DOW.
HORSE RAKE.
No. 248,478.  Patented Oct. 18, 1881.
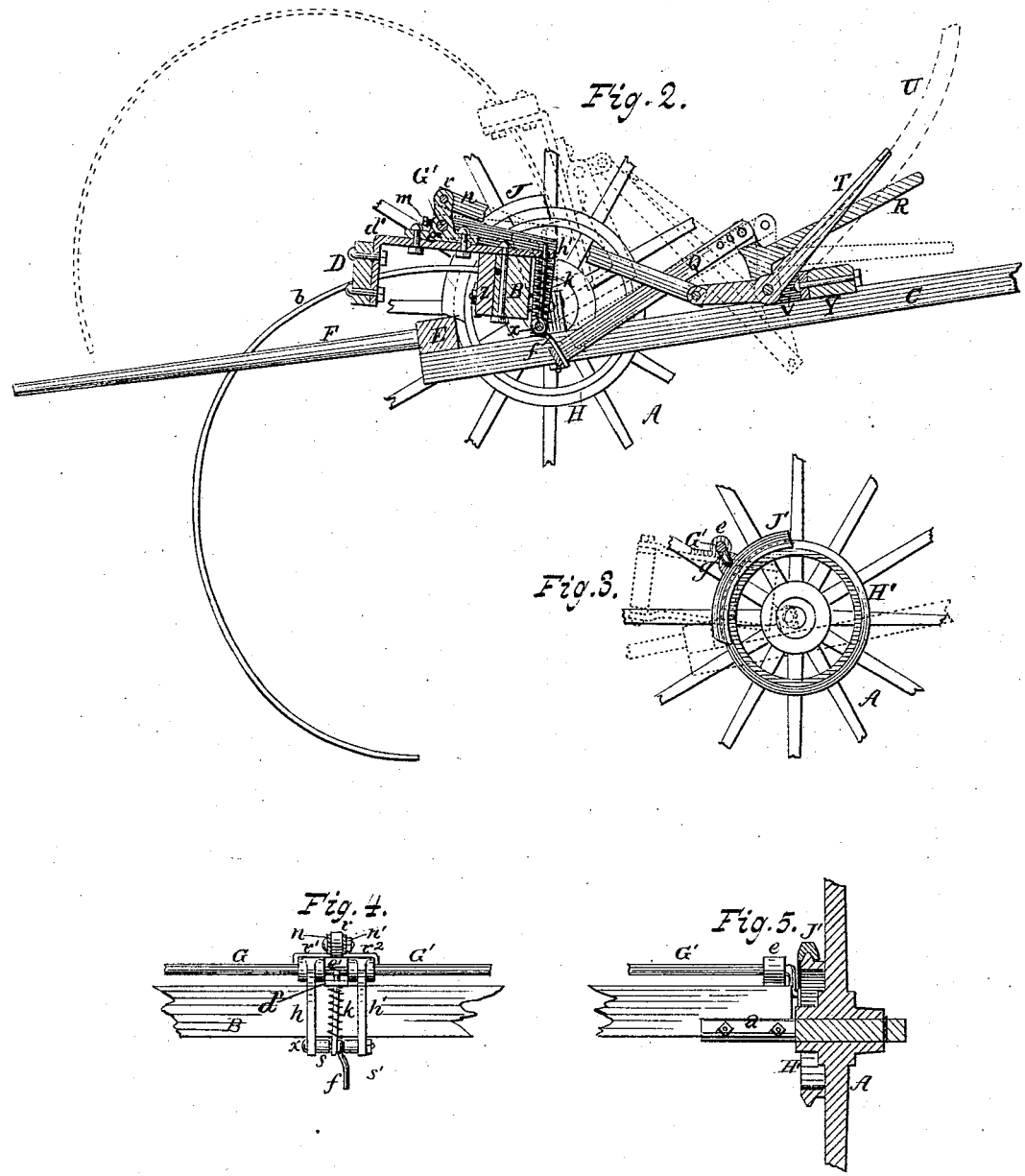
Witnesses:
Jas. E. Hutchinson.
J. A. Rutherford
Inventor.
Chas. La Dow,
By James L. Norris, atty (No Model.) 3 Sheets—Sheet 3.
C. LA DOW.
HORSE RAKE.
No. 248,478. Patented Oct. 18, 1881.
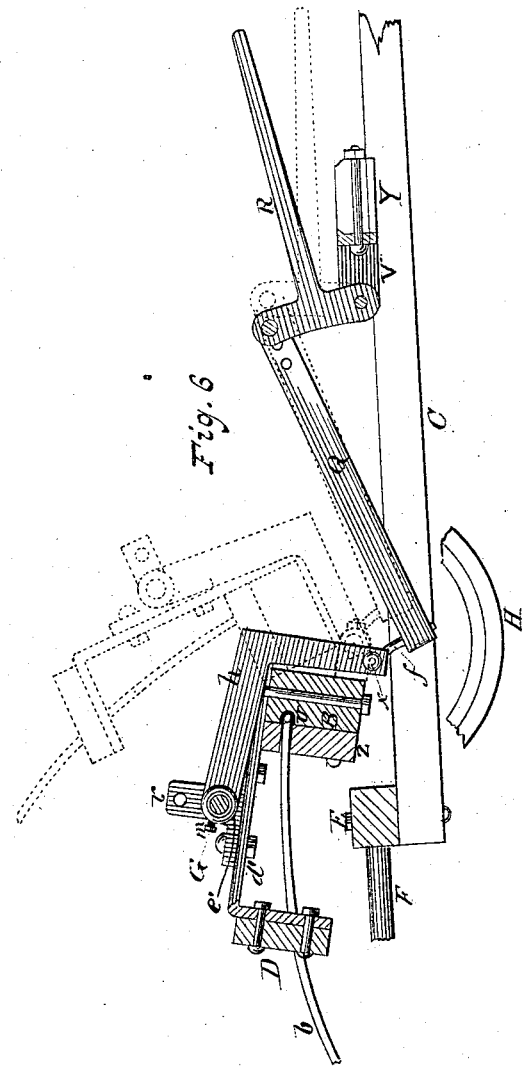
Witnesses.
Jas. E. Hutchinson.
J. A. Rutherford
Inventor.
Chas. La Dow,
By James L. Norris.
att'y

UNITED STATES PATENT OFFICE.

CHARLES LA DOW, OF ALBANY, NEW YORK.

HORSE-RAKE.

SPECIFICATION forming part of Letters Patent No. 248,478, dated October 18, 1881.

Application filed January 13, 1881. (No model.)

*To all whom it may concern:*

Be it known that I, CHARLES LA DOW, a citizen of the United States, residing at Albany, in the county of Albany and State of New York, have invented new and useful Improvements in Horse-Rakes, of which the following is a specification.

This invention relates to certain improvements in that class of horse-rakes in which the load is discharged by the power of the team through the medium of grooved wheel-hubs and angular brake-blocks connected with a pedal, in such a manner that when the pedal is depressed the brake-blocks are caused to bind in the grooves of the wheel-hubs and move around with the same, carrying the rake-head, until a fixed stop operates to release the brake-blocks and permit the rake-head to drop back to its normal position.

The object of my invention is to improve such class of friction dumping devices and place them under perfect control of the operator, so that the angular opposing faces of the friction device can be connected or released during all stages of the operation of discharging the hay by the power of the team.

The invention is embodied in the horse-rake illustrated in the accompanying drawings, in which Figure 1 represents a plan view; Fig. 2, a longitudinal section thereof; Fig. 3, a side view of the friction dumping device; Fig. 4, a detail view, showing the central bearing of the crank-rods and elbow-levers; Fig. 5, a sectional view of the friction dumping device; and Fig. 6, a sectional view of the rake-head, tooth-bar, and controllable devices for applying and releasing the opposing faces of the friction device.

The letters A A indicate the ground-wheels, which are provided with short axles $a$, attached to the ends of the rake-head B. The rake-head is hinged to the thills C, as at $c$ $c$, and the tooth-bar D is connected with the rake-head at each end and at the center by the right-angled straps $d$ $d$ and $d'$. The rake-teeth are pivoted on the rake-head and confined by means of the retaining-bar Z. The usual clearer teeth or fingers, F, or similar devices, are employed for stripping the hay from the teeth. The wheels A are provided with wedge-shaped rings H H', attached to the inner sides of the wheel-spokes, which are arranged to operate in connection with the friction brake-blocks J J', which are provided with V-shaped grooves. These brake-blocks are arranged on the crank-arms $g$ $g'$ of the transverse rods G G', the inner adjacent ends of the latter being arranged and retained in the central bearing, $e'$, secured to the rake-head, the outer portions of said rods being journaled in the boxes $e$ $e$, which are attached to the outer ends of the rake-head. The transverse crank-arms G G' are capable of being rotated in their bearings $e$ $e'$, and for this purpose they are provided at their inner adjacent ends with elbow levers or arms $h$ $h'$, the latter being provided with hubs or collars, in which the ends of the crank-rods are adjustably fixed by set-screws $m$ $m$.

The central box or bearing, $e'$, is provided with laterally-projecting flanges $r'$ $r^2$, which extend over the hubs of the levers or arms $h$ $h'$ and have their ends bent down against the said hubs, so as to prevent longitudinal movements of the elbow-levers, especially when the wheels are removed for shipping the machine. The lower ends of the elbow levers or arms $h$ $h'$ are flexibly or loosely connected by a pin, $x$, which permits the levers or arms to rock in opposite or reverse directions.

A depending pin or link, $f$, is swiveled on the pin $x$, and is retained at the center thereof by the ferrules $s$ $s'$, and the lower end of the pin or link $f$ is rigidly attached to the bar Q, which latter is connected at its other end to a pivoted lever, R, arranged to rise and fall in a vertical plane. The lever R is operated or depressed by the foot of the attendant, and through the medium of the bar Q, elbow-levers $h$ $h'$, and the transverse crank-rods G G' the brake-blocks J J' are caused to engage the wedge-shaped rings H H', and thus elevate the rake-head and discharge the load by the power of the team through the rotation of the ground-wheels.

The friction dumping device herein described is under perfect control of the operator, and the angular opposing faces of the friction device can be engaged or disengaged at any stage of the operation, and thus permit the rake-head to be raised a short distance only and immediately lowered, as may be desired.

To the cross-pin $x$ of the elbow levers or arms $h$ $h'$ is attached the lower end of a vertical pin, $k$, the upper end of which extends loosely through an eye or perforation in the forward end of the central metallic strap, d', which is arranged intermediate of the elbow-levers h h', and on the pin k, between the under side of the strap and the cross-pin x, is arranged a spiral or other suitable spring. This arrangement of devices exerts a yielding force at all times to retain the horizontal portions of the elbow-levers h h' down against the rake-head, and thus normally keep the opposing angular faces of the friction dumping device out of contact, and thus prevent undue wear. In operation, the depression of the foot-lever R draws the pin x up to a point nearly in coincidence with a line through the axis on which the rake-head turns when elevated; hence but a slight pressure of the foot is required to lift the elbow-levers h h' and rotate the transverse crank-rods. When the foot-lever R is depressed and the angular grooved brake-blocks J J' caused to engage the wedge-shaped rings H H', the brake-blocks can be immediately and positively released from engagement with the wedge-shaped rings at any stage of the operation at the will of the attendant.

By keeping the pressure on the foot-lever and retaining it against the cross-bar Y of the thills, the rake-teeth may be carried by the brake-blocks and wedge-rings without sliding the ground-wheels, because the contact of the opposing angular friction-surfaces is reduced by the foot-lever striking the thill-frame.

The crank-arms of the transverse rods G G' are of such length and so arranged that when the pressure is released from the foot-lever the brake-blocks will be released by the revolution of the friction-rings, and when the brake-blocks are applied the tendency of said crank-arms is to get into line with the center of their axis and the axis of the wedge-shaped rings. Consequently, in turning curves or turning the machine around such action is of advantage, because in turning the machine the wheels rotate in opposite directions, or else one wheel advances more rapidly than the other, and when this occurs the pin x, by its flexible connection with the elbow-levers h h', will permit the latter to rock in directions corresponding to the motions of the supporting-wheels, and hence the opposing angular friction-surfaces of the advancing wheel will more closely engage and possess greater lifting power than the opposing angular friction-surfaces of the other wheel; hence, when turning curves, the rake-head can be lifted by the advancing wheel.

The usual pivoted lever, T, is employed for elevating the rake-head when it is desired to transport the machine, and keeps the rake-teeth from the ground. This lever is connected to one end of the rod n, and the latter is attached at its other end to the ears r. It is evident that the independent nature of the transverse crank-rods and their elbow-levers renders it possible to employ the controllable friction dumping device at one side of the machine only.

The controllable friction dumping device herein described possesses important advantages over similar machines of this class. The brake-blocks and wedge-shaped rings, adapted to fit one within the other when in operation, absolutely prevent the possibility of their moving laterally when dumping the rake, which is a serious objection to those horse-rakes in which a plane-faced brake-shoe engages a plane-faced friction-ring. Furthermore, the angularity of the opposing faces of the friction devices provides extended bearings, and thereby imparts greater power to the dumping device; and, further, by the combination of the wedge-shaped friction-ring and the angular grooved friction-blocks, mounted on the crank-rods, with the described mechanism whereby the friction dumping device is placed under perfect control of the operator, I not only derive the advantages of the angular opposing faces of the friction ring and block, which avoid lateral movements, but I also enable the operator to apply or release the brake in a positive manner during any and all stages of discharging the hay. This is of manifest advantage over those hay-rakes in which the wheel-hubs are grooved, and V-shaped brake-blocks are arranged to be held or locked in the grooved hub by the forward movement of the wheel through the medium of toggle-levers connecting the brake-block with the foot-pedal.

Other constructions of angular friction-blocks and grooved hubs are not under control of the operator. They cannot be released at any time, but must be carried around until a fixed stop on the machine acts to release the brake-blocks from engagement with the grooved hub, and the rake therefore cannot be lowered until the toggle-levers are acted on by the fixed stop. Such objectionable features are entirely overcome by my invention.

I do not broadly claim a controllable friction dumping device for horse-rakes; but,

Having thus described my invention, what I claim is—

1. In a horse hay-rake, the combination and arrangement of the rake-frame, the traveling wheels, the wedge-shaped friction-rings thereon, the crank-rods supporting the V-shaped friction brake-blocks having the crank-levers with the spring mechanism, whereby the brake-blocks can be applied to and released from the opposing wedge-shaped face of each of the friction-rings at the will of the operator, all substantially as shown and described.

2. The combination, with the two crank-rods and the two elbow-levers attached thereto, of the central box or bearing in which the inner adjacent ends of the crank-rods are journaled, and the flanges attached to the said box or bearing and extending horizontally over the elbow-levers to prevent lateral movements of the same, substantially as described.

3. The combination of the central strap attached to the rake-head and having an opening in its forward end, the spring-encircled stem extending upward into the opening in the strap, and having its lower end attached to a cross-pin, which connects the elbow-levers and serves to hold the swivel-pin with which the foot-lever is connected, substantially as and for the purpose described.

4. The elbow-levers having hubs or collars and set-screws, in combination with the transverse crank-rods carrying the friction brake-blocks, and the wheels having friction-rings, substantially as and for the purpose described.

In testimony whereof I have hereunto set my hand in the presence of two subscribing witnesses.

CHARLES LA DOW.

Witnesses:
E. WACKERHAGEN,
JAS. H. MELICK.